US011410054B2

(12) United States Patent
Bouz et al.

(10) Patent No.: US 11,410,054 B2
(45) Date of Patent: Aug. 9, 2022

(54) COGNITIVE PREDICTION OF PROBLEMATIC SERVERS IN UNKNOWN SERVER GROUP

(71) Applicant: Kyndryl, Inc., New York, NY (US)

(72) Inventors: Firas Bouz, Lexington, KY (US); Pawel Jasionowski, Wroclaw (PL); George E. Stark, Austin, TX (US)

(73) Assignee: KYNDRYL, INC., New York, NY (US)

( * ) Notice: Subject to any disclaimer, the term of this patent is extended or adjusted under 35 U.S.C. 154(b) by 1181 days.

(21) Appl. No.: 15/459,267

(22) Filed: Mar. 15, 2017

(65) Prior Publication Data
US 2018/0268301 A1   Sep. 20, 2018

(51) Int. Cl.
*G06N 5/04* (2006.01)
*H04L 67/303* (2022.01)
*H04L 67/00* (2022.01)

(52) U.S. Cl.
CPC ............. *G06N 5/04* (2013.01); *H04L 67/303* (2013.01); *H04L 67/34* (2013.01)

(58) Field of Classification Search
CPC ......... G06N 5/04; H04L 67/34; H04L 67/303; G06F 11/008
See application file for complete search history.

(56) References Cited

U.S. PATENT DOCUMENTS 7,580,901 B2   8/2009   Johnson et al.
7,627,511 B2   12/2009  Takano et al.
8,355,976 B2   1/2013   Ghosh et al.
8,402,546 B2   3/2013   Greenshpon et al.
8,407,139 B1   3/2013   Palmer
(Continued)

FOREIGN PATENT DOCUMENTS

CN   103592919 A       2/2014
WO   2014092838 A1     6/2014

OTHER PUBLICATIONS

Vishwanath et al., "Characterizing Cloud Computing Hardware Reliability," SoCC'10, Jun. 10-11, 2010, Indianapolis, Indiana, USA (Year: 2010).*
Kanoun et al., "Benchmarking the dependability of Windows and Linux using PostMark/spl trade/ workloads," 16th IEEE International Symposium on Software Reliability Engineering (ISSRE'05), Chicago, IL, 2005 (Year: 2005).*
(Continued)

*Primary Examiner* — Miranda M Huang
*Assistant Examiner* — Yao David Huang
(74) *Attorney, Agent, or Firm* — Erik Swanson; Andrew M. Calderon; Roberts Calderon Safran & Cole, P C.

(57) ABSTRACT

A set of profile parameters to characterize an unknown group of servers is computed. A set of known groups of servers is selected from a historical repository of known group of servers. A subset of known group is selected such that each known group in the subset has a corresponding similarity distance that is within a threshold similarity distance from the unknown group. A decision tree is constructed corresponding to a known group in the subset, by cognitively analyzing a usage of the set of profile parameters of the unknown group in the known group. Using the decision tree a number of problematic servers is predicted in the unknown group. When the predicted number of problematic servers does not exceed a threshold number, a post-prediction action is caused to occur on the unknown group, which causes a reduction in an actual number of problematic servers in the unknown group.

20 Claims, 6 Drawing Sheets

(56) References Cited

U.S. PATENT DOCUMENTS

| | | | |
|---|---|---|---|
| 9,215,158 | B1 | 12/2015 | Adogla et al. |
| 10,048,996 | B1* | 8/2018 | Bell .................... G06F 11/3006 |
| 2009/0129793 | A1* | 5/2009 | Milton ............... G03G 21/0011 399/38 |
| 2012/0084238 | A1* | 4/2012 | Kristal ................... G06Q 10/04 706/12 |
| 2013/0283088 | A1* | 10/2013 | Behrendt ............ G06F 11/0748 714/2 |
| 2013/0318022 | A1 | 11/2013 | Yadav et al. |
| 2014/0298112 | A1 | 10/2014 | Otsuka et al. |
| 2015/0135012 | A1* | 5/2015 | Bhalla .................. H04L 41/147 714/26 |
| 2015/0170054 | A1* | 6/2015 | Allen ................... H04L 67/125 706/11 |
| 2016/0072835 | A1 | 3/2016 | Roytman et al. |
| 2016/0228003 | A1* | 8/2016 | Apte .................... A61B 5/4836 |
| 2016/0364625 | A1* | 12/2016 | Lin ........................... G06T 7/90 |
| 2017/0109222 | A1* | 4/2017 | Singh ..................... G07C 5/008 |
| 2017/0206026 | A1* | 7/2017 | Narayanan ........... G06F 3/0614 |
| 2017/0308802 | A1* | 10/2017 | Ramsoy ................. G06N 20/20 |

OTHER PUBLICATIONS

Visweswaran et al. "Learning Instance-Specific Predictive Models," Journal of Machine Learning Research 11 (2010) 3333-3369 (Year: 2010).*

Guan et al., "Ensemble of Bayesian Predictors and Decision Trees for Proactive Failure Management in Cloud Computing Systems," Journal of Communications, vol. 7, No. 1, Jan. 2012 (Year: 2012).*

Maldonado M, Dean J, Czika W, et al. Leveraging ensemble models in SAS® Enterprise MinerTM. (Paper SAS 133-2014). In: Proceedings of the SAS® Global Forum 2014 Conference. Cary, NC: SAS Institute, Inc.; 2014. <https://support.sas.com/resources/papers/proceedings14/SAS133-2014.pdf>. (Year: 2014).*

Kordmahalleh et al., "Hurricane Trajectory Prediction Via a Sparse Recurrent Neural Network," Jan. 2015 Conference: Fifth International Workshop on Climate Informatics (Year: 2015).*

Mickens et al., "Exploiting Availability Prediction in Distributed Systems," NSDI '06: 3rd Symposium on Networked Systems Design & Implementation (Year: 2006).*

\* cited by examiner

COGNITIVE PREDICTION OF PROBLEMATIC SERVERS IN UNKNOWN SERVER GROUP

TECHNICAL FIELD

The present invention relates generally to a method, system, and computer program product for estimating problematic server class by corroborating historical classification, predictive analytics, and user projections. More particularly, the present invention relates to a method, system, and computer program product for cognitive prediction of problematic servers in an unknown server group.

BACKGROUND

Hereinafter, a data processing system of any type is interchangeably referred to as simply "system" or "server" unless expressly disambiguated where used. A set of systems is interchangeably referred to as a set of servers, a server group, or a system group, unless expressly disambiguated where used.

Managing a set of systems, e.g., for a customer or a datacenter tenant, is an activity that is commonly a part of service agreements. Each set of systems potentially can have a different composition of the types of systems, different configuration or roles in which those systems operate, different manners of using those systems, different utilizations, different ages, and many other differences from set to set.

Often, taking on the management responsibility for a set of systems is fraught with a number of unknown characteristics of the set. Accordingly, committing to any particular service level agreement (SLA) for managing and keeping a set of systems operational is frequently based on incomplete knowledge of the set, mixed with a significant amount of speculation.

In some cases, to minimize the speculative portion of the commitment, extensive and intrusive investigation is performed on a contemplated set of systems. Such investigation requires participation of expert resources who must be diverted from other tasks, disruption of one or more systems, adverse effect on the performance of one or more systems that are being investigated, or some combination of these and other undesirable effects.

SUMMARY

The illustrative embodiments provide a method, system, and computer program product. An embodiment includes a method that computes a set of profile parameters that characterize an unknown group of servers. The embodiment selects from a historical repository of known group of servers, a set of known groups of servers. The embodiment selects a subset of the set of known group such that each known group in the subset of the set of known group has a corresponding similarity distance that is within a threshold similarity distance from the unknown group. The embodiment constructs, using a processor and a memory, a decision tree corresponding to a known group in the selected subset of known groups, by cognitively analyzing a usage of the set of profile parameters of the unknown group in the known group. The embodiment computes using the decision tree a predicted number of problematic servers in the unknown group. The embodiment causes, responsive to the predicted number of problematic servers not exceeding a threshold number, a post-prediction action on the unknown group, wherein the post-prediction action causes a reduction in an actual number of problematic servers in the unknown group.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
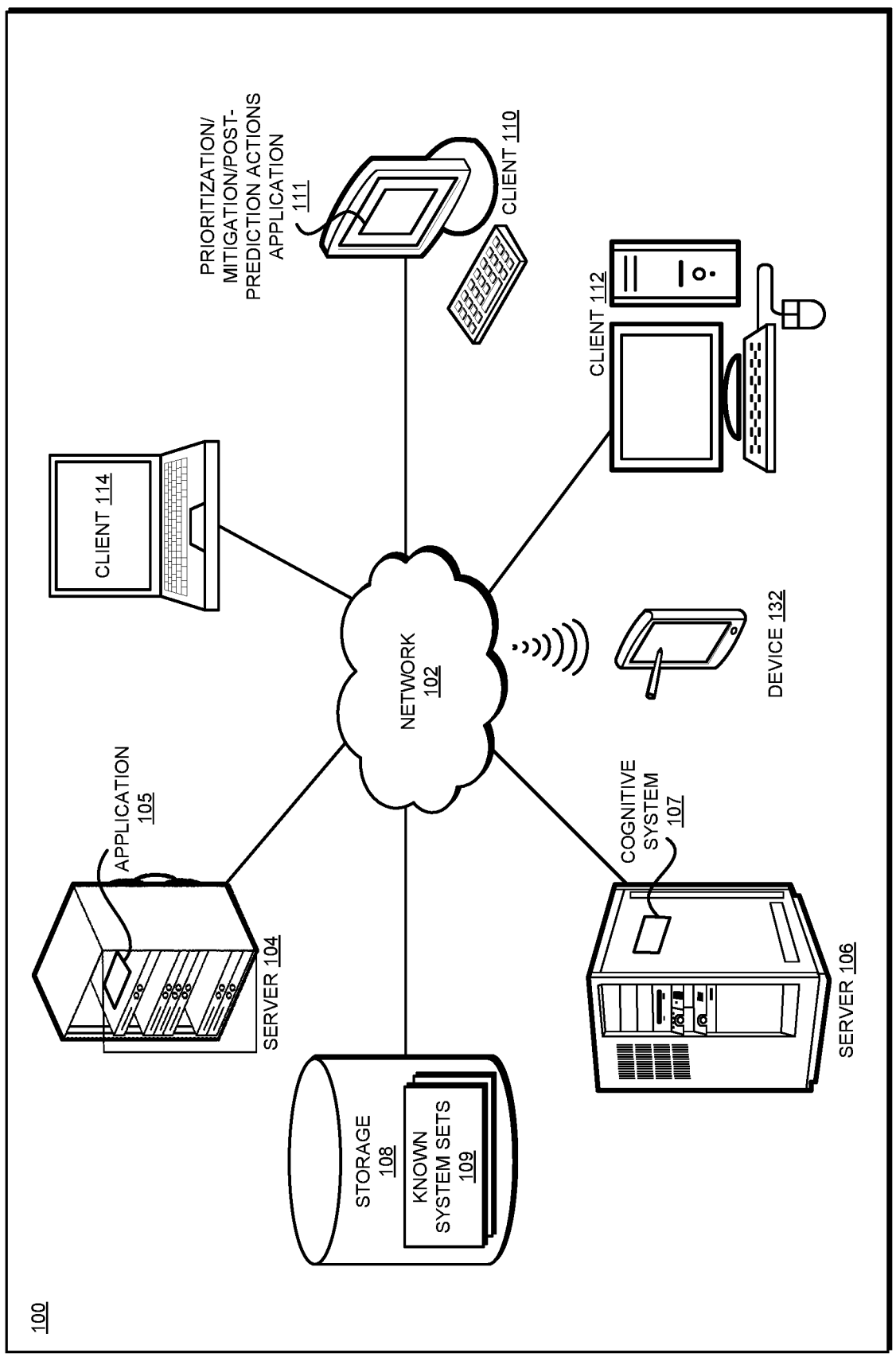
FIG. 1 depicts a block diagram of a network of data processing systems in which illustrative embodiments may be implemented.

The illustrative embodiments recognize that neither the speculative method nor the intrusive method of investigating a set of systems that have to be managed is desirable. A lightweight non-intrusive method that can reliably predict the number of problematic servers and other attributes of interest for a new (unseen or unknown) set of systems is needed.

The illustrative embodiments recognize that the presently available tools or solutions do not address these needs or provide adequate solutions for these needs. The illustrative embodiments used to describe the invention generally address and solve the above-described problems and other problems related to cognitive prediction of problematic servers in an unknown server group.

An embodiment can be implemented as a software application. The application implementing an embodiment can be configured as a modification of an existing cognitive system, as a separate application that operates in conjunction with an existing cognitive system, a standalone application, or some combination thereof.

A cognitive system is an artificial intelligence application executing on data processing hardware. Cognitive systems are in a category of technologies that uses natural language processing and machine learning to enable people and machines to interact more naturally to extend and magnify human expertise and cognition. These systems learn from an available body of knowledge (knowledgebase) and answer questions and queries pertaining to the subject-matter domain of the knowledgebase by analyzing the relationships and significant aspects that are expressed in or inferable from the knowledgebase. For example, a knowledgebase of a domain can include structured repository of domain-specific information, such as ontologies, or unstructured data related to the domain, or a collection of natural language documents about the domain.

A question and answer system (Q and A system) answers is a type of cognitive system. A Q and A system questions pertaining to a given subject-matter domain presented in natural language.

An embodiment provides a fast, lightweight, and non-intrusive method of predicting a number or volume of problematic systems in a previously unknown or unseen set of systems. A system is problematic when the system fails to satisfy a requirement for a threshold period of time, the requirement including, but not limited to, unavailability of a service or the system. For example, a system is problematic if a number of unavailability incidents exceed a threshold number for the system. An unavailability incident may render the entire system unavailable to perform an operation of the system, or render a service provided by the system unavailable for at least a threshold period of time.

The embodiment receives or collects a limited amount of information about an unknown environment which can be readily provided without any intrusive investigation into the set of systems in the environment. For example, the collected inputs include an overall number (or percentage or percentile) of servers, numbers (or percentage or percentile) of servers in particular OS families—such as AIX, Linux, Windows, HP, (AIX, Linux, Windows, and HP are trademarks owned by their respective owners), and number (or percentage or percentile) of severs with assigned purposes or groups, number (or percentage or percentile) of servers in a specified age category, choice of change volume in the environment (e.g., small, medium, large), and so on. These data inputs can be collected without detailed study of the unknown set of systems, such as by asking the questions as a simple survey questionnaire.

As an illustrative example, suppose that a problematic server is a server with 1 or more of server unavailable incidents in a particular period of time, e.g., 12 months, where server unavailable incident is the incident where impact is determined as a service interruption—e.g. server going down, hanging, freezing, or otherwise becoming unreachable.

An example survey for a given unknown set of systems is as follows—
Question 1: Number of servers in particular OS families (AIX, Linux, Windows, HP, Other)?
Question 2: How many of servers are grouped as, or present in, the production (active) environment?
Question 3: How many of production servers are of the types storage element, rack, or network device?
Question 4: Provide the number of servers with particular purposes (Application, Backup, Database, Development, Infrastructure, Monitoring, Network, Security, Storage, Terminal, Virtualization, Web, Citrix) (Citrix is a trademark.)
Assume that the following answers are collected for the unknown set of systems:

TABLE 1

| N | Question | Options | Number |
|---|---|---|---|
| 1. | Servers in particular OS families | AIX | 51 |
| | | Linux | 104 |
| | | Windows | 714 |
| | | HP | 0 |
| | | Other | 2 |
| 2. | Servers by server lifecycle | Production (active) | 800 |
| | | Deployment | 70 |
| | | Transition | 0 |
| | | Sunset | 1 |
| | | Other | 0 |
| 3. | How many of production servers are storage element, rack, or network device | | 30 |
| 4. | Production servers with particular purpose (without storage element, rack, or network device) | Application | 590 |
| | | Backup | 5 |
| | | DB | 15 |
| | | Development | 1 |
| | | Infrastructure | 100 |
| | | Monitoring | 10 |
| | | Network | 10 |
| | | Security | 0 |
| | | Storage | 8 |
| | | Terminal | 1 |
| | | Virtualization | 30 |
| | | Web | 0 |
| | | Citrix | 0 |

A repository of historical information is available, where the historical information includes a variety of information about sets of systems previously encountered in various types of activities or engagements. For example, such sets may have been used for service agreements entered into previously, or consulting engagements for any of the several types of activities—such as configuration, migration, modernization, expansion, relocation etc. During such engagements a variety of information becomes available about the sets of systems, such as the type of operating system (OS) a system uses in a given set, the distribution of the different OSs in the given set, the age of a system in a set, distribution of the systems of various ages in the set, the utilization of a system in a set, distribution of the systems with various utilizations of various resources in the set, the purpose or use of a system in a set, distribution of the systems for various purposes or uses in the set, and the like.

An embodiment analyzes the historical information to nominate server parameters that are significant for determining whether a server is problematic. some examples of such server parameters include, but are not limited to, the distribution of servers by average utilization, or the distribution of servers by operating system family. The embodiment uses these parameters to create a profile for the set of systems in the repository. The profile represents one or more particular parameters and their corresponding values for a set of systems. As a non-limiting example, assume that the embodiment groups the historical servers by customer accounts, and assigns such a profile to a server group of each account.

An embodiment constructs a profile of the unknown set based on the survey. Consider the answers received in Table 1, above—

The embodiment compute the number of production servers in particular OS families. As an example, the embodiment combines the information from questions 1, 2, and 3 to find that only 800 servers are in production, and 30 of them are storage element, rack, or network device. Thus, the embodiment determines that only 770 (88%) of the servers are in the scope of the problem to be solved, i.e., predict a number of problematic production servers.

The embodiment computes the number of servers in particular classes by multiplying the input answers by computed percent according to the formula:

Number of servers in the profile of the unknown set=ceiling(Number*Percent)

where:

ceiling(x)=min{n in Z, n≥x} (the smallest integer not less than x).

The embodiment produces the following— ment selects one or more known sets from the repository as being similar to the unknown set in some respect.

Consider the example values in table 2, above. Assume that the repository contains ten previously analyzed sets where a number of problematic servers and a number of non-problematic servers has been previously determined. Note that the sample of ten example sets is practically very small and is used only for example purposes; in practice, the historical repository will have hundreds of analyzed sets.

The profile values of the ten example sets are represented as sets A-J as follows—

TABLE 3

| N | Option | A | B | C | D | E | F | G | H | I | J |
|---|--------|---|---|---|---|---|---|---|---|---|---|
| 1 | AIX | 50 | 100 | 10 | 20 | 10 | 10 | 150 | 1500 | 1000 | 45 |
|   | Linux | 100 | 10 | 10 | 120 | 30 | 5 | 150 | 100 | 500 | 90 |
|   | Windows | 600 | 40 | 200 | 340 | 200 | 790 | 50 | 300 | 1500 | 615 |
|   | HP | 0 | 0 | 500 | 5 | 85 | 5 | 0 | 10 | 0 | 0 |
|   | Other | 0 | 0 | 100 | 10 | 15 | 0 | 0 | 5 | 30 | 0 |
| 2 | Application | 500 | 110 | 720 | 400 | 300 | 800 | 290 | 1700 | 3000 | 505 |
|   | Backup | 0 | 0 | 5 | 5 | 10 | 0 | 0 | 15 | 0 | 0 |
|   | DB | 20 | 10 | 10 | 5 | 0 | 0 | 30 | 100 | 30 | 25 |
|   | Development | 0 | 0 | 5 | 5 | 0 | 0 | 20 | 0 | 0 | 0 |
|   | Infrastructure | 100 | 10 | 20 | 20 | 30 | 0 | 10 | 10 | 0 | 90 |
|   | Monitoring | 10 | 0 | 40 | 5 | 0 | 0 | 0 | 20 | 0 | 9 |
|   | Network | 10 | 10 | 0 | 40 | 0 | 0 | 0 | 10 | 0 | 9 |
|   | Security | 0 | 0 | 10 | 0 | 0 | 0 | 0 | 20 | 0 | 0 |
|   | Storage | 10 | 0 | 5 | 0 | 0 | 0 | 0 | 10 | 0 | 9 |
|   | Terminal | 0 | 0 | 5 | 0 | 0 | 0 | 0 | 5 | 0 | 0 |
|   | Virtualization | 100 | 10 | 0 | 5 | 0 | 0 | 0 | 5 | 0 | 103 |
|   | Web | 0 | 0 | 0 | 5 | 0 | 0 | 0 | 20 | 0 | 0 |
|   | Citrix | 0 | 0 | 0 | 5 | 0 | 10 | 0 | 0 | 0 | 0 |

TABLE 2

| N | Question | Options | Profile value |
|---|----------|---------|---------------|
| 1 | Servers in particular OS families | AIX | 41 |
|   |  | Linux | 92 |
|   |  | Windows | 628 |
|   |  | HP | 0 |
|   |  | Other | 2 |
| 2 | Servers with particular purpose | Application | 472 |
|   |  | Backup | 4 |
|   |  | DB | 13 |
|   |  | Development | 1 |
|   |  | Infrastructure | 88 |
|   |  | Monitoring | 9 |
|   |  | Network | 9 |
|   |  | Security | 0 |
|   |  | Storage | 7 |
|   |  | Terminal | 1 |
|   |  | Virtualization | 26 |
|   |  | Web | 0 |
|   |  | Citrix | 0 |

An embodiment compares the unknown set of servers with the sets existing in the repository using the computed profile values of the unknown set and the values of the significant parameters in the profiles associated with the sets in the repository. Through such comparisons, the embodi- The known sets in the repository can vary widely. In a majority of the cases, not every set in the repository is likely to be comparable to the unknown set. therefore, from the available sets in the repository, an embodiment performs an initial selection of those known sets whose profiles have some threshold degree of similarity with the profile of the unknown set.

For each of the selected known set, an embodiment computes a difference value relative to the unknown set. in one embodiment, the difference value is the Euclidean distance between the values associated with the unknown set and the profile values associated with a known set of systems. Euclidean distance is a square root of a sum of the squared differences between corresponding values in the unknown set input and the known set profile, and is represented as follows—

$$\text{Euclidian}(x) = \sqrt{\sum_{i=1}^{n} (p_i - q_i)^2}$$

Where $q_i$ is a profile value of a known set and $p_i$ is a profile value computed for the unknown set.

Based on tables 2 and 3, the distance computations yield the following results—

TABLE 4

| N | Option | A | B | C | D | E | F | G | H | I | J |
|---|--------|---|---|---|---|---|---|---|---|---|---|
| 1 | AIX | 1 | 2401 | 1681 | 961 | 1681 | 1681 | 9801 | 2099601 | 900601 | 36 |
|   | Linux | 16 | 8836 | 8836 | 256 | 5476 | 9801 | 2116 | 16 | 156816 | 196 |
|   | Windows | 12996 | 454276 | 264196 | 139876 | 264196 | 5776 | 440896 | 171396 | 617796 | 9801 |

TABLE 4-continued

| N | Option | A | B | C | D | E | F | G | H | I | J |
|---|---|---|---|---|---|---|---|---|---|---|---|
|   | HP | 0 | 0 | 250000 | 25 | 7225 | 25 | 0 | 100 | 0 | 0 |
|   | Other | 4 | 4 | 9604 | 64 | 169 | 4 | 4 | 9 | 784 | 4 |
| 2 | Application | 8100 | 230400 | 16900 | 36100 | 84100 | 44100 | 90000 | 1232100 | 5808100 | 7225 |
|   | Backup | 25 | 25 | 0 | 0 | 25 | 25 | 25 | 100 | 25 | 25 |
|   | DB | 25 | 25 | 25 | 100 | 225 | 225 | 225 | 7225 | 225 | 100 |
|   | Development | 1 | 1 | 16 | 16 | 1 | 1 | 361 | 1 | 1 | 1 |
|   | Infrastructure | 0 | 8100 | 6400 | 6400 | 4900 | 10000 | 8100 | 8100 | 10000 | 100 |
|   | Monitoring | 0 | 100 | 900 | 25 | 100 | 100 | 100 | 100 | 100 | 1 |
|   | Network | 0 | 0 | 100 | 900 | 100 | 100 | 100 | 0 | 100 | 1 |
|   | Security | 0 | 0 | 100 | 0 | 0 | 0 | 0 | 400 | 0 | 0 |
|   | Storage | 4 | 64 | 9 | 64 | 64 | 64 | 64 | 4 | 64 | 1 |
|   | Terminal | 1 | 1 | 16 | 1 | 1 | 1 | 1 | 16 | 1 | 1 |
|   | Virtualization | 4900 | 400 | 900 | 625 | 900 | 900 | 900 | 625 | 900 | 5329 |
|   | Web | 0 | 0 | 0 | 25 | 0 | 0 | 0 | 400 | 0 | 0 |
|   | Citrix | 0 | 0 | 0 | 25 | 0 | 100 | 0 | 0 | 0 | 0 |
| 3 | Euclidean | 161 | 839 | 748 | 431 | 608 | 270 | 743 | 1876 | 2738 | 151 |

Even with the selection of only some known sets as similar to the unknown set, the Euclidean distance reveals that some known sets are more distant or different from the unknown set than others. An embodiment selects a subset of those selected known sets that are closest, or most similar—to the unknown set, based on the computed Euclidean distances. Assume, as a non-limiting example, that only the nearest 10 percent of the known sets are of interest in a given circumstance. In this example situation, and using the example computations of table 4, nearest 10% mean two known sets—A and J—from the repository.

For each shortlisted known set in the distance based selected subset of known sets, an embodiment creates a decision tree model. A decision tree model, or simply a decision tree, includes a set of rules to decide, as an objective of the model, whether a system is problematic or non-problematic in that set. The model corresponding to a set is a predictive model that uses a decision tree to decide whether a server in the set is problematic.

A decision in the decision tree depends upon the value of at least one variable. In order to be able to evaluate the unknown set using the decision tree, the embodiment constructs the decision tree of a known set dynamically, using as variables the information collected about the unknown set from the survey, e.g., as in table 2. For example, a decision in a decision tree may depend on (i) the number of servers in a particular OS family and (ii) the purpose for which a server or group of servers is used in the unknown set. A node in a decision tree provides a relative likelihood of a server, which satisfies the variables used to reach the node, being problematic. the relative likelihood can be represented in any suitable manner including, but not limited to, a ratio of problematic and non-problematic servers at that node.

A node can have a decision subtree for which the node acts as a root. In other words, an additional variable from a node (parent node) will lead to another child node in the decision subtree of the from the parent node. Any of the existing model construction methodology may be used for constructing the decision tree model within the scope of the illustrative embodiments.

Example decision trees resulting from the subset selection after table 4 may depict nodes with the following decisions in a suitable way—

Decision tree model for known set A:
Purpose:
Application, Development, Web
OS:
AIX: Non-problematic=97%, Problematic=3%
Other, Linux, HP: Non-problematic=95%, Problematic=5%
Windows: Non-problematic=91%, Problematic=9%
DB: Non-problematic=65%, Problematic=35%
Backup
OS:
AIX, HP, Linux: Non-problematic=96%, Problematic=4%
Other: Non-problematic=90%, Problematic=10%
Windows: Non-problematic=88%, Problematic=12%
Terminal: Non-problematic=100%, Problematic=0%
Infrastructure, Virtualization, Citrix, Monitoring: Non-problematic=95%, Problematic=5%
Network, Security, Storage: Non-problematic=89%, Problematic=11%
Decision tree model for known set J:
Purpose:
Application, Development
OS:
AIX: Non-problematic=97%, Problematic=3%
HP, Linux: Non-problematic=98%, Problematic=2%
Other: Non-problematic=90%, Problematic=10%
Windows: Non-problematic=95%, Problematic=5%
DB: Non-problematic=64%, Problematic=36%
Backup
OS:
AIX, HP: Non-problematic=97%, Problematic=3%
Other, Linux: Non-problematic=91%, Problematic=9%
Windows: Non-problematic=93%, Problematic=7%
Terminal: Non-problematic=100%, Problematic=0%
Infrastructure, Virtualization, Citrix:
OS:
AIX: Non-problematic=99%, Problematic=1%
HP, Other, Linux: Non-problematic=95%, Problematic=5%
Windows: Non-problematic=97%, Problematic=3%
Network, Security, Storage, Monitoring, Web: Non-problematic=92%, Problematic=8%

An embodiment applies all or some of the decision trees to the unknown set based on the information collected from the survey (e.g., as shown in table 2). The unknown set has the following distribution of OS: AIX 6%, Linux 12%, Windows 82%, HP 0%, Other 0%. By using this distribution an embodiment computes the number of predicted problematic and non-problematic servers in each purpose classes in the following example manner using the decision trees of known sets A and J:

For Application AIX server (based on known set A) 3% are predicted problematic, so the embodiment predicts that in the unknown set the likelihood exists for 1 problematic server (590×0.06×0.03) in this class. For Infrastructure Windows server (based on known set J) 3% are predicted problematic, so the embodiment predicts that in the unknown set the likelihood exists for 2 problematic servers (100×0.82×0.03) in this class.

All example calculated results based on example decision trees for example known sets A and J are presented in the below table:

TABLE 5

| Purpose | Number | Problematic (based on A) | | | | | Problematic (based on J) | | | | |
| --- | --- | --- | --- | --- | --- | --- | --- | --- | --- | --- | --- |
| | | AIX | Linux | HP | Win | Other | AIX | Linux | HP | Win | Other |
| Application | 590 | 1 | 4 | 0 | 44 | 0 | 1 | 1 | 0 | 24 | 0 |
| Backup | 5 | 0 | 0 | 0 | 0 | 0 | 0 | 0 | 0 | 0 | 0 |
| DB | 15 | 0 | 1 | 0 | 4 | 0 | 0 | 1 | 0 | 4 | 0 |
| Development | 1 | 0 | 0 | 0 | 0 | 0 | 0 | 0 | 0 | 0 | 0 |
| Infrastructure | 100 | 0 | 1 | 0 | 4 | 0 | 0 | 1 | 0 | 2 | 0 |
| Monitoring | 10 | 0 | 0 | 0 | 0 | 0 | 0 | 0 | 0 | 1 | 0 |
| Network | 10 | 0 | 0 | 0 | 1 | 0 | 0 | 0 | 0 | 1 | 0 |
| Security | 0 | 0 | 0 | 0 | 0 | 0 | 0 | 0 | 0 | 0 | 0 |
| Storage | 8 | 0 | 0 | 0 | 1 | 0 | 0 | 0 | 0 | 1 | 0 |
| Terminal | 1 | 0 | 0 | 0 | 0 | 0 | 0 | 0 | 0 | 0 | 0 |
| Virtualization | 30 | 0 | 0 | 0 | 1 | 0 | 0 | 0 | 0 | 1 | 0 |
| Web | 0 | 0 | 0 | 0 | 0 | 0 | 0 | 0 | 0 | 0 | 0 |
| Citrix | 0 | 0 | 0 | 0 | 0 | 0 | 0 | 0 | 0 | 0 | 0 |

When multiple decision trees are used on an unknown set, different numbers of problematic servers can result for the same group, type, or classification of servers. Accordingly, an embodiment uses a statistical method to compute a single predicted number of problematic servers in a given group, type, or classification of servers in the unknown set. For example, one statistical method computes an average of the problematic server numbers from all decision trees applied to the unknown set. For example, if the servers are grouped by OS family, the embodiment averages the number of problematic and non-problematic servers in each OS family group across all decision trees that are applied.

For the example unknown set, using the example decision trees of known sets A and J, and applying the averaging method, an embodiment predicts the likely numbers of problematic servers in the various OS families in the unknown set as follows—

TABLE 6

| AIX | Linux | HP | Windows | Other |
| --- | --- | --- | --- | --- |
| 1 | 5 | 0 | 45 | 0 |

The total number of predicted problematic servers is: 51 (7% of analyzed servers in the unknown set). The group-wise predictions and the total prediction can be visualized or presented in a suitable manner, including but not limited to a bar-graph or other graphical representation.

In some cases, the predicted number of problematic servers may exceed a threshold number, which may trigger one post-prediction action. Some examples of such post-prediction actions include an operation of a post-prediction actions application to produce a specific output, such as a change in an agreement, pricing, level of service, or commitment. In some other cases, the predicted number of problematic servers may not exceed the threshold number, which may trigger a different post-prediction action. Some examples of such post-prediction actions include an operation of a post-prediction actions application to produce a different output, such as a different value in an agreement, pricing, level of service, or commitment. A post-prediction action can also be a problem remediation action to cause a problematic server to become non-problematic.

These examples of post-prediction actions are not intended to be limiting. From this disclosure, those of ordinary skill in the art will be able to conceive many other post-prediction actions, and the same are contemplated within the scope of the illustrative embodiments.

For example, the predicted number of problematic servers may cause a prioritization to occur in a queue. With finite sets of resources, priorities must always be established using what is hoped to bring about the best yield. Suppose that several unknown sets are being evaluated in the manner described herein. If at least some of the problematic servers have to be subjected to remediation actions, the prediction of an embodiment can be used as a prioritization criterion to select which unknown set gets prioritized first, next, etc. This rate prediction method can feed the creation of pipeline priorities and increase confidence in the yield from the limited resources.

An example prioritization may be to start the remediation actions in those unknown sets with the greatest predicted problematic rate. Once a post-prediction action has been executed on an unknown set, the prediction method of the illustrative embodiments can be re-performed on the (remedied) unknown set to re-evaluate the likelihood of problematic servers in the set.

The manner of cognitive prediction of problematic servers in an unknown server group described herein is unavailable in the presently available methods. A method of an embodiment described herein, when implemented to execute on a device or data processing system, comprises substantial advancement of the functionality of that device or data processing system in a lightweight non-intrusive cognitive prediction based analysis of unknown or unknown data processing environments. The illustrative embodiments not only answer questions about the expected number of problematic devices in the environment, those of ordinary skill in the art can adapt an embodiment to also compute the expected number of incidents per month by severity and impact, the expected downtime for the environment, and other similarly purposed information. For example, an embodiment can be adapted to also calculate the estimated effort required to manage a given data processing environment and a list of accounts with similarly configured environments. Such information about other similar environments is useful to enable one user managing one environment to collaborate with other users managing other similar environments.

The illustrative embodiments are described with respect to certain types of systems, classifications, OS families, groups, uses, purposes, sets, parameters, profiles, values, distance computations, statistical methods, post-prediction actions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
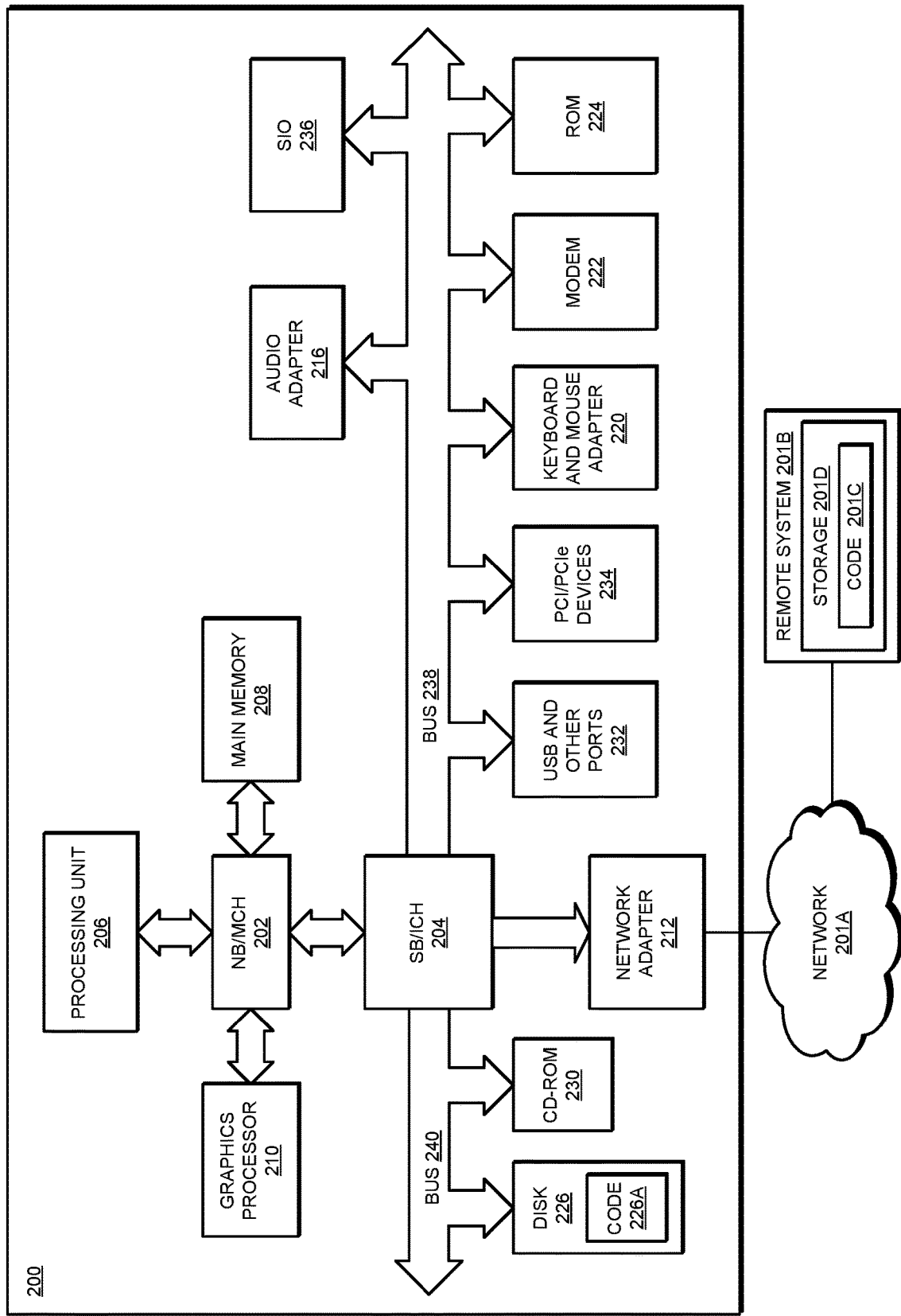
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Uses cognitive system 107 to produce one or more decision trees corresponding to one or more shortlisted known sets from known sets 109, as described herein. Application 105 generates a post-prediction instruction for cause a prioritization, remediation, mitigation, or other post-prediction action at post-prediction actions application 111, in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications.

Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or usergenerated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
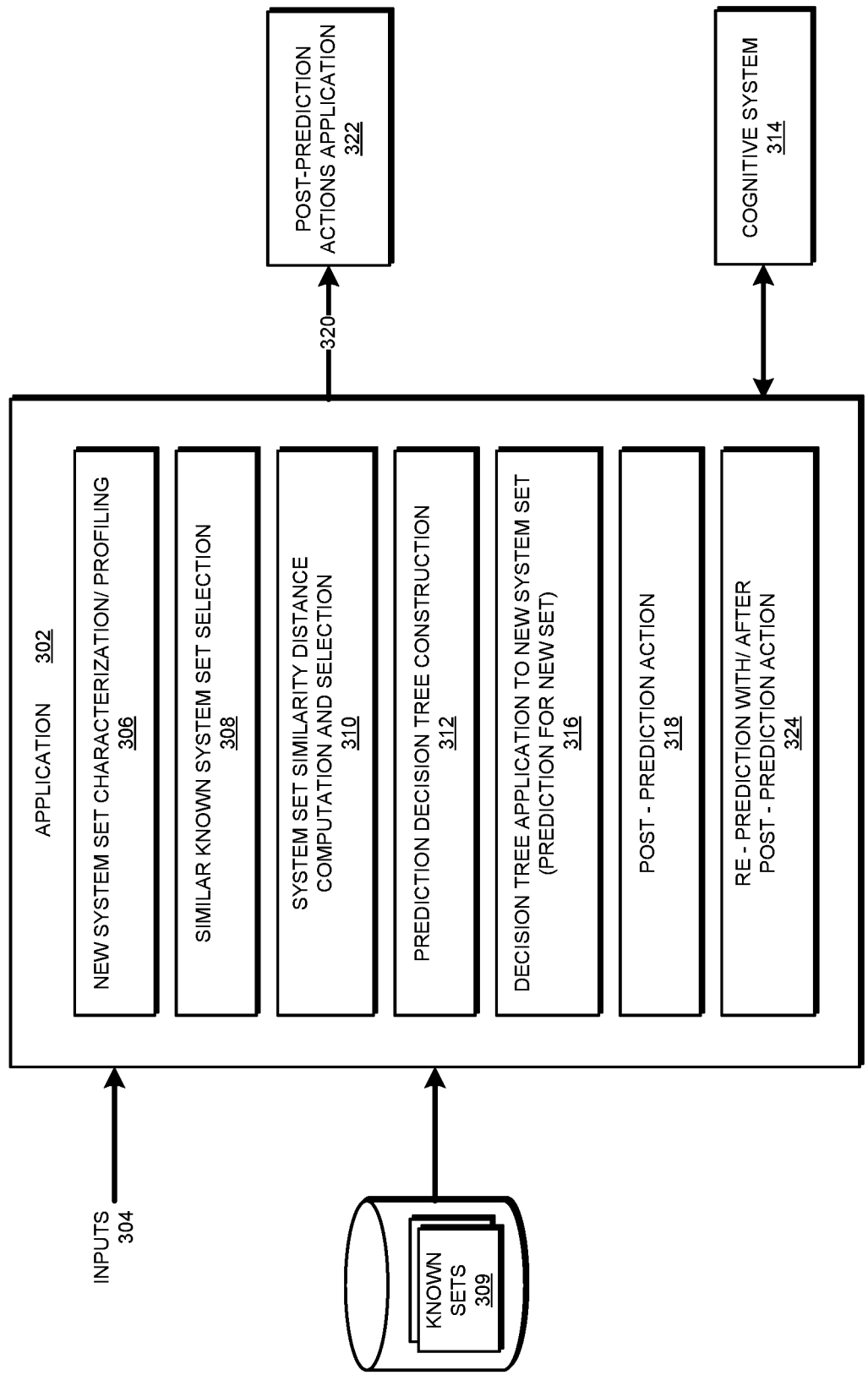
FIG. 3 a block diagram of an example logic flow for cognitive prediction of problematic servers in an unknown server group in accordance with an illustrative embodiment.

With reference to FIG. 3, this figure depicts a block diagram of an example logic flow for cognitive prediction of problematic servers in an unknown server group in accordance with an illustrative embodiment. Application 302 is an example of application 105 in FIG. 1.

Inputs 304 pertain to an unknown set of servers, and are received in response to a survey, e.g., the questionnaire of table 1. Without implying any limitations, inputs 304 can take the form of the values recorded in example table 2.

Component 306 constructs a profile of the unknown set, such as by determining the significant grouping and other characteristics that exist in the unknown set. component 308 accesses known sets 309 in a repository of historically known sets, and selects one or more known sets that have a specified degree and/or type of similarities with the unknown set.

Component 310 computes a similarity distance between each selected known set and the unknown set. The distance may be Euclidean distance as described herein, but may also be other distances computed using other methods between two values. Based on the computed distances, component 310 selects some or all known sets from the selection made by component 308.

Component 312 uses cognitive system 314 to compute and construct a decision tree corresponding to each known set selected by component 310, and using inputs 304 that specify the unknown set. Component 316 applies the decision tree of a selected known set to the unknown set to predict a likely number of problematic servers in the unknown set according to the applied decision tree. Component 316 applies each decision tree of each selected known set to the unknown set and computes a corresponding likely number of problematic servers in this manner. Component 316 applies a selected statistical method to the various predicted numbers of problematic servers to obtain a single predicted number of problematic servers in the unknown set.

Component 318 causes instruction 320 to be sent to post-prediction actions application 322, which is an example of application 111 in FIG. 1. In one embodiment, instruction 320 may take the form of a report to be presented at application 322. In another embodiment, instruction 320 may be an instruction to automatically cause application 322 to perform a post-prediction action in a manner described herein. Component 324 optionally causes the re-computation of a prediction for the unknown set after a post-prediction action has been performed or applied on the unknown set.

Figure 4:
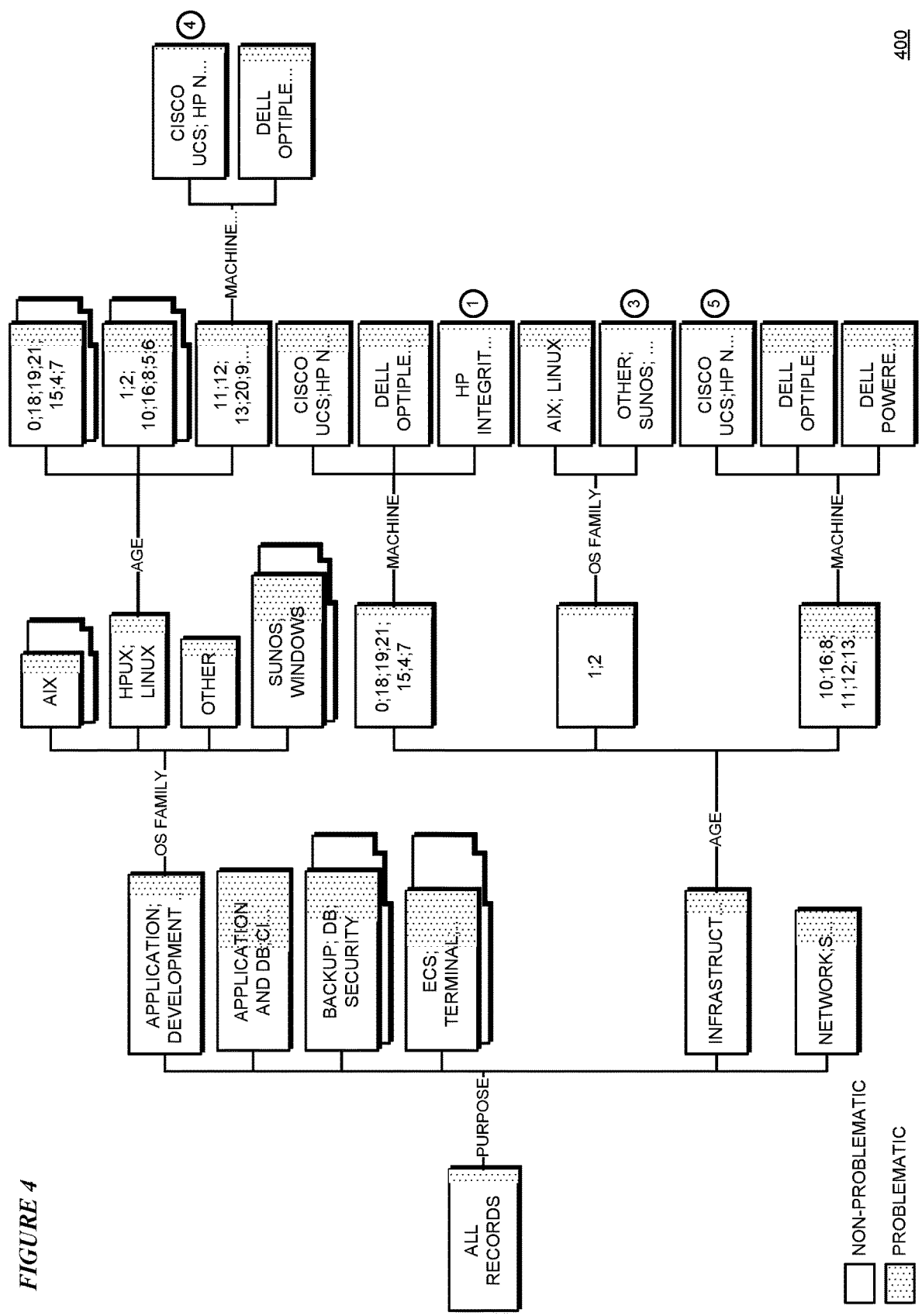
FIG. 4 depicts one example decision tree constructed in accordance with an illustrative embodiment.

With reference to FIG. 4, this figure depicts one example decision tree constructed in accordance with an illustrative embodiment. Component 312 in FIG. 3 is usable to construct tree 400 using cognitive system 314 in FIG. 3.

Decision tree 400 corresponds to a selected known set that is within a threshold distance of similarity from the unknown set. Suppose that the significant parameters of the unknown set are—a purpose for which groups of servers are used, the OS family installed on the groups, the age of the servers in the groups, and the type of machine or architecture family used as servers in the groups.

Figure 5:
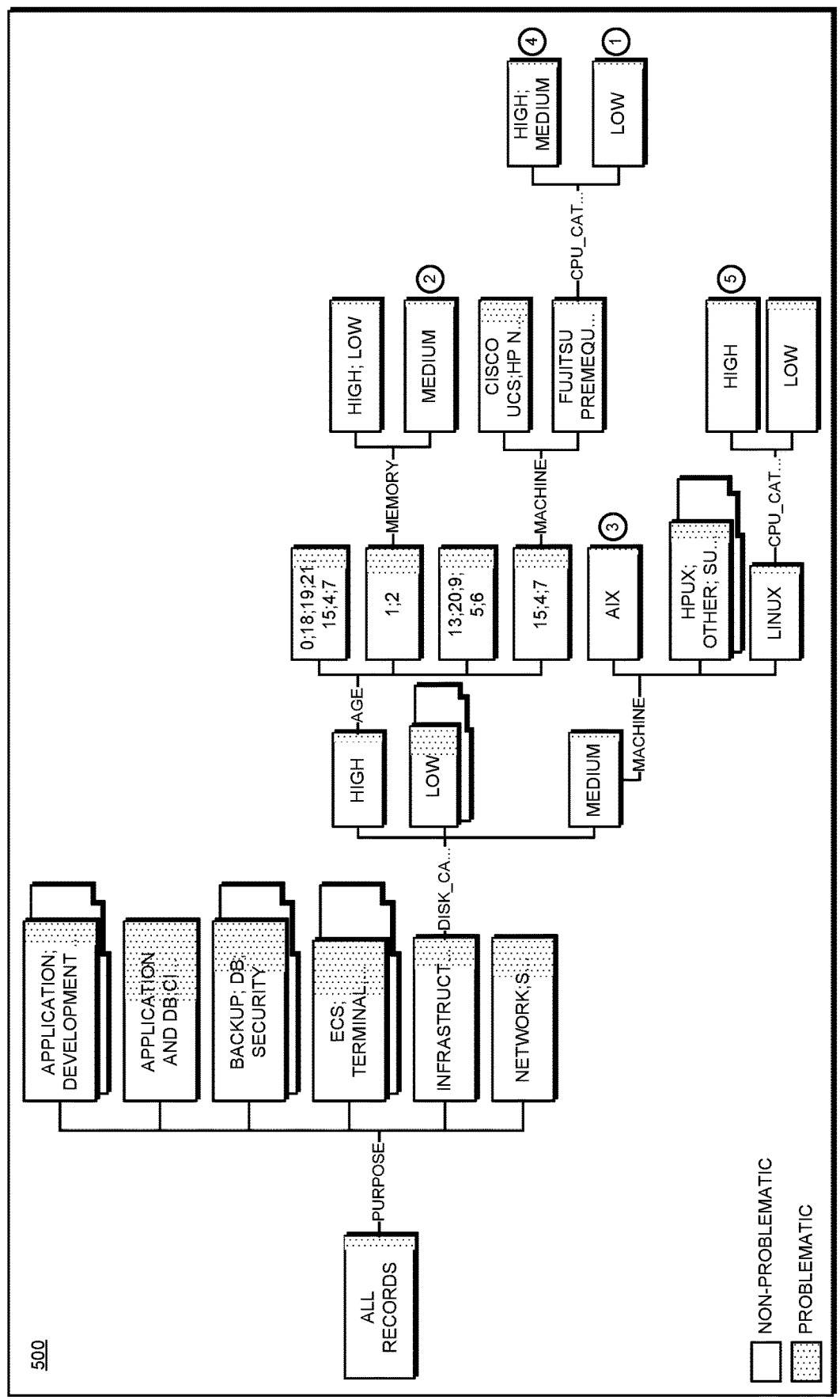
FIG. 5 depicts another example decision tree constructed in accordance with an illustrative embodiment.

With reference to FIG. 5, this figure depicts another example decision tree constructed in accordance with an illustrative embodiment. Component 312 in FIG. 3 is usable to construct tree 500 using cognitive system 314 in FIG. 3.

Decision tree 500 corresponds to another selected known set that is within a threshold distance of similarity from the unknown set. Suppose that additional significant parameters of the unknown set include utilization data for certain resources, such as memory, disk, and processor. Such data is also mapped into decision tree 500 as shown to allow prediction based on such parameters as well.

Figure 6:
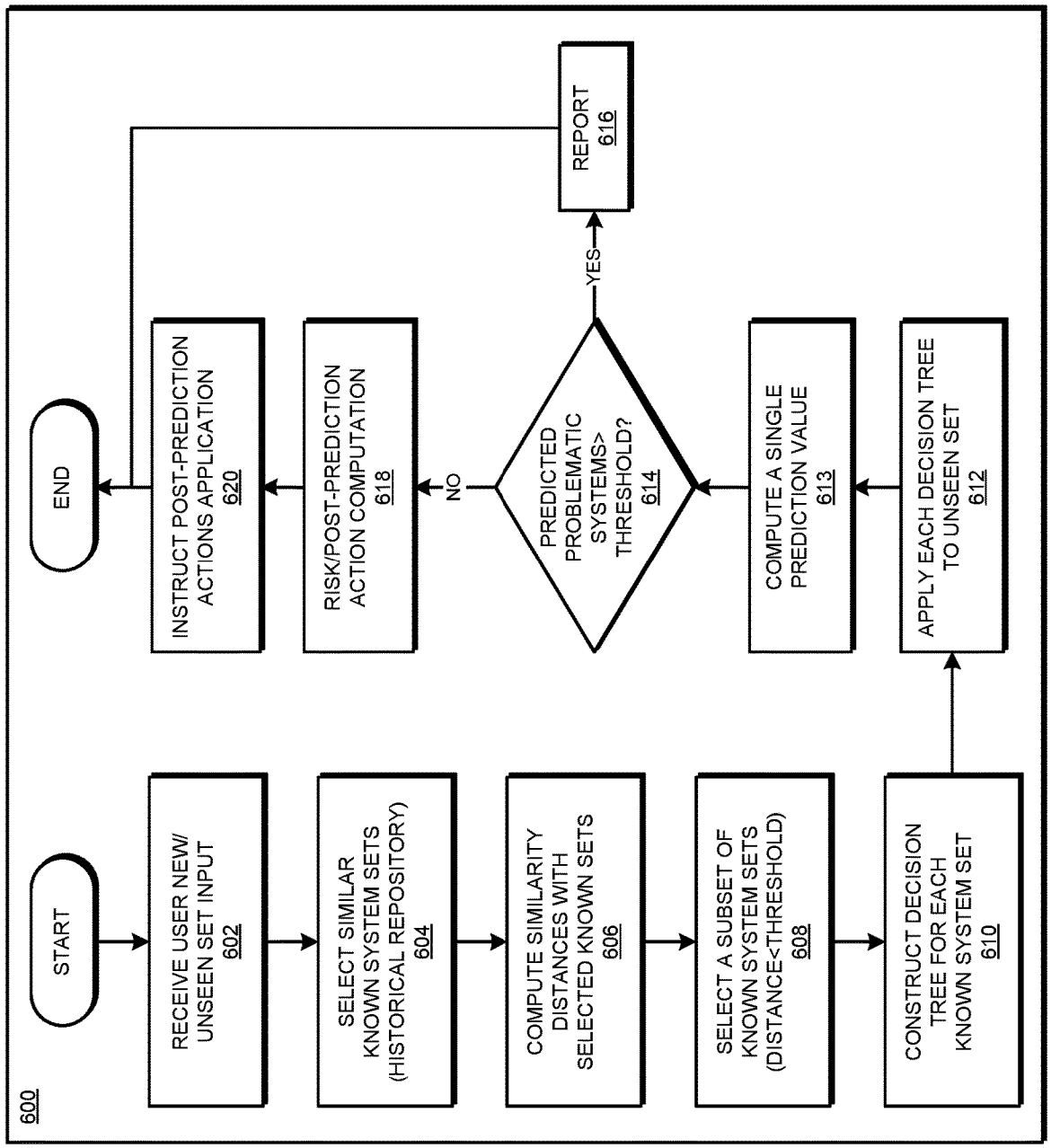
FIG. 6 depicts a flowchart of an example process for cognitive prediction of problematic servers in an unknown server group.

With reference to FIG. 6, this figure depicts a flowchart of an example process for cognitive prediction of problematic servers in an unknown server group. Process 600 can be implemented in application 302 in FIG. 3.

The application receives inputs specifying an unknown set of servers, e.g., in response to a survey of high-level questions (block 602). The application selects a subset of known sets of servers from a set of known sets of servers in historical repository (block 604). The selection of block 604 is based on profile parameters determined for the unknown set and the profile parameters associated with the known sets, and a specified degree of match between at least some of the profile parameters of the unknown and the known sets.

The application computes a similarity distance between the unknown set and each of the known sets in the subset (block 606). The application selects a subset of the subset of known sets based on a threshold distance (block 608). For example, the known sets selected in the sub-subset are those whose similarity distance from the unknown set is within a threshold distance or whose similarity distances are within a certain percentile of the distances.

The application constructs a decision tree corresponding to each known set in the sub-subset (block 610). The application applies each decision tree to the unknown set to produce a prediction value from the decision tree (block 612). The application computes a single prediction value, to wit, a single predicted number of problematic server, from the various prediction values from the various decision trees (block 613).

The application determines whether the predicted number of problematic systems in the unknown set exceeds a threshold (block 614). If the predicted number exceeds the threshold ("Yes'" path of block 614), the application causes an action, e.g., a report to be sent to cause a post-prediction action (block 616).

If the predicted number does not exceed the threshold ("No" path of block 614), the application performs a computation of a risk value associated with the unknown set and/or computation of another post-prediction action (block 618). The application sends an instruction to a post-prediction actions application (block 620). The application ends thereafter.

In one optional embodiment, the application re-executes process 600 after a post-prediction action has been applied to the unknown set.

Thus, a computer implemented method, system or apparatus, and computer program product are provided in the illustrative embodiments for cognitive prediction of problematic servers in an unknown server group and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   computing a set of profile values for a set of profile parameters that characterize an unknown group of servers for which historical availability data is unavailable using a first set of input values collected for the unknown group of servers;
   selecting a set of known groups of servers for which historical availability data is available from a historical repository of known groups of servers, wherein the historical availability data includes information about a first known group of servers in the set of known groups of servers,
   wherein the information about the first known group of servers includes a first percentage of problematic servers in the first known group of servers that experienced unavailability incidents;
   selecting a subset of known groups of servers from the set of known groups of servers such that each known group in the subset of known groups has a corresponding similarity distance that is within a threshold similarity distance from the unknown group,
   wherein the selecting of the subset of known groups of servers includes:
      identifying, from among the known groups in the set of known groups of servers, a plurality of the known groups of servers that are most similar to the unknown group of servers, wherein the plurality of known groups of servers comprises the first known group of servers and a second known group of servers; and
      designating the first and second known groups of servers as being in the subset of known groups of servers;
   constructing, using a processor and a memory, a first decision tree using data of the first known group of servers and a second decision tree using data of the second known group of servers,
   wherein the first decision tree comprises:
      a decision that depends on input values of the first set of input values for the unknown group of servers; and
      a node that provides a relative likelihood of servers in the unknown group of servers being problematic based on the first percentage of problematic servers in the historical availability data for the first known group in the subset of known groups of servers;
   computing, using the first percentage of problematic servers provided by the node of the first decision tree, a first predicted number of problematic servers in the unknown group; and
   causing, responsive to the first predicted number of problematic servers not exceeding a threshold number, a post-prediction action on the unknown group,
   wherein the post-prediction action causes a reduction in an actual number of problematic servers in the unknown group.

2. The method of claim 1, further comprising:
   calculating, for each known group in the set of known groups of servers, respective similarity distances relative to the unknown group of servers,
   wherein the identifying of the first and second known groups comprises determining that the first and second known groups are among a designated percentage of the known groups that are most similar to the unknown group of servers based on the similarity distances, and
   wherein the designating of the first and second known groups of servers as being in the subset of known groups of servers further comprises designating each known group in the designated percentage of the known groups as being in the subset of known groups of servers,
   wherein the information about the second known group of servers includes a second percentage of problematic servers in the second known group of servers that experienced unavailability incidents;
   computing, using information about the second known group of servers provided by the second decision tree from the historical availability data, a second predicted number of problematic servers in the unknown group,
   wherein the information about the second known group of servers includes a percentage of problematic servers in the second known group of servers that experienced unavailability incidents; and
   computing a final predicted number using the first predicted number and the second predicted number in a statistical operation.

3. The method of claim 1, further comprising constructing a subtree of the first decision tree corresponding to a second set of input values of the unknown group.

4. The method of claim 1, wherein a particular known group of servers has a corresponding profile, the profile characterizing the particular known group such that different unknown groups with different profile parameters are comparable with the particular known group.

5. The method of claim 1, further comprising:
receiving, responsive to a set of questions, the first set of input values,
wherein the computing of the set of profile values comprises computing the set of profile values based at least in part on the first set of input values;
computing a number of servers in the unknown group having input values that lead to the node in the first decision tree,
wherein the computing of the first predicted number of problematic servers in the unknown group comprises calculating a product of the first percentage of problematic servers in the first known group and the number of servers in the unknown group having input values that lead to the node.

6. The method of claim 5, further comprising:
presenting a question in the set of questions that is answerable without consuming any computing resource of any server in the unknown group.

7. The method of claim 1, wherein a profile parameter in the set of profile parameters comprises a type of use for a sub-group of the unknown group of servers.

8. The method of claim 7, wherein the type of use comprises use in a data processing environment infrastructure.

9. The method of claim 1, wherein a profile parameter in the set of profile parameters comprises a type of operating system used in a sub-group of the unknown group of servers.

10. The method of claim 1, wherein a profile parameter in the set of profile parameters comprises average age of a sub-group of the unknown group of servers.

11. A computer usable program product comprising a computer-readable storage medium, and program instructions stored on the computer-readable storage medium, the stored program instructions comprising:
program instructions to compute a set of profile values for a set of profile parameters that characterize an unknown group of servers for which historical availability data is unavailable using a first set of input values collected for the unknown group of servers;
program instructions to select a set of known groups of servers for which historical availability data is available from a historical repository of known groups of servers, wherein the historical availability data includes information about a first known group of servers in the set of known groups of servers,
wherein the information about the first known group of servers includes a first percentage of problematic servers in the first known group of servers that experienced unavailability incidents;
program instructions to select a subset of known groups of servers from the set of known groups of servers such that each known group in the subset of known groups has a corresponding similarity distance that is within a threshold similarity distance from the unknown group,
wherein the program instructions to select the subset of known groups of servers includes:
program instructions to identify, from among the known groups in the set of known groups of servers, a plurality of the known groups of servers that are most similar to the unknown group of servers, wherein the plurality of known groups of servers comprises the first known group of servers and a second known group of servers; and
program instructions to designate the first and second known groups of servers as being in the subset of known groups of servers;

program instructions to construct, using a processor and a memory, a first decision tree using data of the first known group of servers and a second decision tree using data of the second known group of servers,
wherein the first decision tree comprises:
a decision that depends on input values of the first set of input values for the unknown group of servers; and
a node that provides a relative likelihood of servers in the unknown group of servers being problematic based on the first percentage of problematic servers in the historical availability data for the first known group in the subset of known groups of servers;
program instructions to compute, using the first percentage of problematic servers provided by the node of the first decision tree, a first predicted number of problematic servers in the unknown group; and
program instructions to cause, responsive to the first predicted number of problematic servers not exceeding a threshold number, a post-prediction action on the unknown group,
wherein the post-prediction action causes a reduction in an actual number of problematic servers in the unknown group.

12. The computer usable program product of claim 11, further comprising:
program instructions to calculate, for each known group in the set of known groups of servers, respective similarity distances relative to the unknown group of servers,
wherein the program instructions to identify the first and second known groups comprises program instructions to determine that the first and second known groups are among a designated percentage of the known groups that are most similar to the unknown group of servers based on the similarity distances, and
wherein the program instructions to designate the first and second known groups of servers as being in the subset of known groups of servers further comprises program instructions to designate each known group in the designated percentage of the known groups as being in the subset of known groups of servers,
wherein the information about the second known group of servers includes a second percentage of problematic servers in the second known group of servers that experienced unavailability incidents;
program instructions to compute, using information about the second known group of servers provided by the second decision tree from the historical availability data, a second predicted number of problematic servers in the unknown group,
wherein the information about the second known group of servers includes a percentage of problematic servers in the second known group of servers that experienced unavailability incidents; and
program instructions to compute a final predicted number using the first predicted number and the second predicted number in a statistical operation.

13. The computer usable program product of claim 11, further comprising program instructions to construct a sub-tree of the first decision tree corresponding to a second set of input values of the unknown group.

14. The computer usable program product of claim 11, wherein a particular known group of servers has a corresponding profile, the profile characterizing the particular known group such that different unknown groups with different profile parameters are comparable with the particular known group.

15. The computer usable program product of claim 11, further comprising:
program instructions to receive, responsive to a set of questions, the first set of input values,
wherein the computing of the set of profile values comprises computing the set of profile values based at least in part on the first set of input values;
program instructions to compute a number of servers in the unknown group having input values that lead to the node in the first decision tree,
wherein the program instructions to compute the first predicted number of problematic servers in the unknown group comprise program instructions to calculate a product of the first percentage of problematic servers in the first known group and the number of servers in the unknown group having input values that lead to the node.

16. The computer usable program product of claim 15, further comprising:
program instructions to present a question in the set of questions that is answerable without consuming any computing resource of any server in the unknown group.

17. The computer usable program product of claim 11, wherein a profile parameter in the set of profile parameters comprises a type of use for a sub-group of the unknown group of servers.

18. The computer usable program product of claim 11, wherein the computer-readable storage medium is in a data processing system, and wherein the program instructions are transferred over a network from a remote data processing system.

19. The computer usable program product of claim 11, wherein the computer-readable storage medium is in a server data processing system, and wherein the program instructions are downloaded over a network to a remote data processing system for use by the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to compute a set of profile values for a set of profile parameters that characterize an unknown group of servers for which historical availability data is unavailable using a first set of input values collected for the unknown group of servers;
program instructions to select a set of known groups of servers for which historical availability data is available from a historical repository of known groups of servers, wherein the historical availability data includes information about a first known group of servers in the set of known groups of servers,
wherein the information about the first known group of servers includes a first percentage of problematic servers in the first known group of servers that experienced unavailability incidents;
program instructions to select a subset of known groups of servers from the set of known groups of servers such that each known group in the subset of known groups has a corresponding similarity distance that is within a threshold similarity distance from the unknown group,
wherein the program instructions to select the subset of known groups of servers includes:
program instructions to identify, from among the known groups in the set of known groups of servers, a plurality of the known groups of servers that are most similar to the unknown group of servers, wherein the plurality of known groups of servers comprises the first known group of servers and a second known group of servers; and
program instructions to designate the first and second known groups of servers as being in the subset of known groups of servers;
program instructions to construct, using a processor and a memory, a first decision tree using data of the first known group of servers and a second decision tree using data of the second known group of servers,
wherein the first decision tree comprises:
a decision that depends on input values of the first set of input values for the unknown group of servers; and
a node that provides a relative likelihood of servers in the unknown group of servers being problematic based on the first percentage of problematic servers in the historical availability data for the first known group in the subset of known groups of servers;
program instructions to compute, using the first percentage of problematic servers provided by the node of the first decision tree, a first predicted number of problematic servers in the unknown group; and
program instructions to cause, responsive to the first predicted number of problematic servers not exceeding a threshold number, a post-prediction action on the unknown group,
wherein the post-prediction action causes a reduction in an actual number of problematic servers in the unknown group.

* * * * *